United States Patent [19]

Komiya

[11] 4,297,624
[45] Oct. 27, 1981

[54] SPINDLE CONTROL SYSTEM

[75] Inventor: Hidetsugu Komiya, Hino, Japan

[73] Assignee: Fujitsu Fanuc Limited, Japan

[21] Appl. No.: 34,142

[22] Filed: Apr. 27, 1979

[30] Foreign Application Priority Data

Apr. 28, 1978 [JP] Japan .................. 53-51694

[51] Int. Cl.$^3$ ............................................. G05B 11/18
[52] U.S. Cl. .................................... 318/594; 318/603;
318/625; 318/590; 318/661
[58] Field of Search ............... 318/569, 570, 594, 603,
318/625, 590, 598, 591, 661

[56] References Cited

U.S. PATENT DOCUMENTS 3,223,830 12/1965 Evans .................................. 318/594
3,551,656 12/1970 Wohlfeil ............................. 318/594
4,031,445 6/1977 Schmermund ..................... 318/570

Primary Examiner—J. V. Truhe
Assistant Examiner—Eugene S. Indyk
Attorney, Agent, or Firm—Staas & Halsey

[57] ABSTRACT

A spindle control system which is provided with a first motor for rotating a spindle, a second motor for positioning the spindle, a pulse generator for generating pulses proportional in number to the rotational angle of the spindle, a counter for counting the pulses from the pulse generator in order to detect the rotational position of the spindle, and circuitry response to the counter means to control positioning of the spindle by the second motor.

7 Claims, 2 Drawing Figures

SPINDLE CONTROL SYSTEM

BACKGROUND OF THE INVENTION

1. Field of the Invention

This invention relates to a spindle control system for stopping a spindle of a machine tool at a predetermined position.

2. Description of the Prior Art

In a machine tool, there are some occasions when a turning operation is followed by milling, punching or the like, which requires that the work mounted on the spindle be positioned at a desired rotational angular position. To perform this, control of the spindle includes both rotation control for the turning operations and position control for positioning the spindle at the desired rotational angular position.

With a conventional spindle control system, both a motor for turning operations and a motor for positioning are used. To position the spindle at a desired rotational angular position, the spindle is brought, under the control of the positioning control, to a specific position where a specific rotational position signal is obtained. The spindle is then positioned at a commanded angular position under the control of the positioning motor.

This prior art method employs, in combination, a detector for producing the specific position signal at the specific rotational position (for example, an original position) of the spindle and a resolver or like detector coupled with the positioning motor to detect its rotational angle. With this method, however, the current position of the spindle at every moment is not available, so that when shifting from turning operations to the positioning control, it is necessary to stop the spindle once at the aforesaid specific position and then to restart the positioning motor to accomplish the positioning control using a rotational position command and a feedback signal from the resolver. Accordingly, the conventional method has the defect that the spindle cannot be rapidly positioned at a commanded position.

SUMMARY OF THE INVENTION

An object of this invention is to provide a spindle control system with which it is possible to bring a spindle to a commanded position without the necessity of stopping it once at such a specific position as mentioned above.

Briefly stated, in the spindle control system of this invention, a pulse generator is coupled with the spindle and pulses from the pulse generator are counted to detect the rotational position of the spindle and then the spindle is positioned on the basis of its detected position.

DESCRIPTION OF THE PREFERRED EMBODIMENTS

Figure 1:
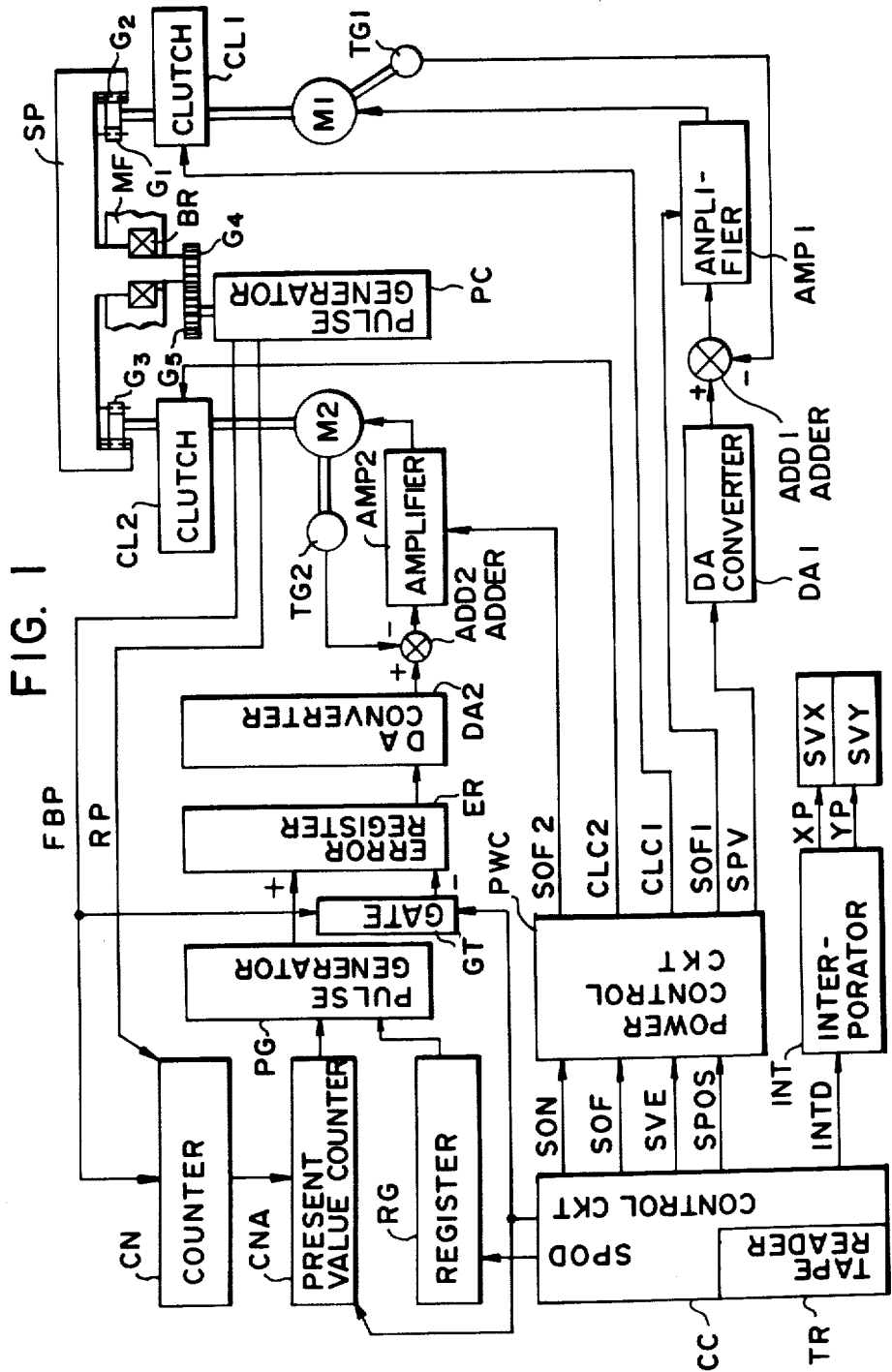
FIG. 1 is a block diagram illustrating a first embodiment of this invention.

In FIG. 1 there is shown in block form a numerical control machine tool embodying this invention. In FIG. 1, reference character SP indicates a spindle, such as a turntable or the like; G1 to G5 designate gears; M1 identifies a motor for turning operations; M2 denotes a motor for positioning use; CL1 and CL2 represent clutches; CC shows a control circuit; TR refers to a tape reader; PWC indicates a power control circuit; DA1 and DA2 designate D-A converters; ADD1 and ADD2 identify adders; AMP1 and AMP2 denote amplifiers; TG1 and TG2 represent tacho generators; PC shows a pulse generator; CN refers to a counter; CNA indicates a present value counter; PG designates a pulse generator; GT identifies a gate; ER denotes an error register; RG represents a register for a rotation command value; INT shows an interpolator; and SVX and SVY refer to axis servos.

During ordinary spindle rotation (turning) operations, revolving speed commands are read as auxiliary function commands by the tape reader TR from a command tape. The control circuit CC applies a spindle ON command SON and a spindle speed command SVE to the power control circuit PWC, which responds to the commands by turning a clutch control signal CLC1 ON and turning a clutch control signal CLC2 OFF, thereby turning the clutch CL1 ON and the clutch CL2 OFF. A revolving speed command SPV is applied from the power control circuit PWC to the D-A converter DA1 for conversion into an analog voltage signal and, since a switching signal SOF1 is ON, the analog voltage signal is applied via the adder ADD1 and the amplifier AMP1 to the motor M1 to drive it. The rotation of the motor M1 is transmitted to the spindle SP via the clutch CL1 and the gears G1 and G2. With the rotation of the spindle SP, a rotor of the pulse generator PC is rotated via the gears G4 and G5. The pulse generator PC yields a feedback pulse FBP every unit rotation of the spindle SP and one pulse RP at a specified rotational angular position of the spindle SP. The counter CN is reset by the pulse RP and counts the feedback pulses FBP, and its count value indicates the current rotational angular position of the spindle SP.

When the tape reader TR reads a spindle positioning command, the control circuit CC sets a positioning command value in the register RG, presets the content of the counter CN into the present value counter CNA, and opens the gate GT. As a result of this, pulses corresponding to the difference between the content of the register RG and that of the counter CNA are applied as command pulses to the error register ER from the pulse generator PG, and the feedback pulses FBP are negatively fed back to the error register ER via the gate GT. Additionally, the control circuit CC provides a positioning mode command SPOS to the power control circuit PWC, thereby turning the clutch control signal CLC1 OFF, turning the clutch control signal CLC2, OFF the switching signal SOF1 and ON a switching signal SOF2 ON.

As a consequence, control of the motor M1 is halted and control of the motor M2 is started. That is, the difference between the current position of the spindle SP and the command position is stored in the error register ER and the value of this difference is converted by the D-A converter DA2 into an analog voltage signal, which is applied via the adder ADD2 and the amplifier AMP2 to the second motor M2 to control its rotation. The rotation of the motor M2 is transmitted to the spindle SP via clutch CL2 and the gears G3 and G2, by which the spindle SP is driven and, at the same time, the pulse generator PC is driven and the resulting feedback pulses FBP are fed back to the error register ER. Accordingly, when the content of the error register ER becomes zero, the motor M2 and the spindle SP are halted to complete positioning. In FIG. 1, the tacho generators TG1 and TG2 serve as speed detectors for speed feedback use and the command SOF is a spindle rotation OFF command to stop the rotation of the spindle after completion of turning operations. Reference character INTD indicates interpolation data, which is provided to the interpolator INT to produce distribution pulses XP and YP for driving the servo systems SVX and SVY, as is well-known in the art.

Figure 2:
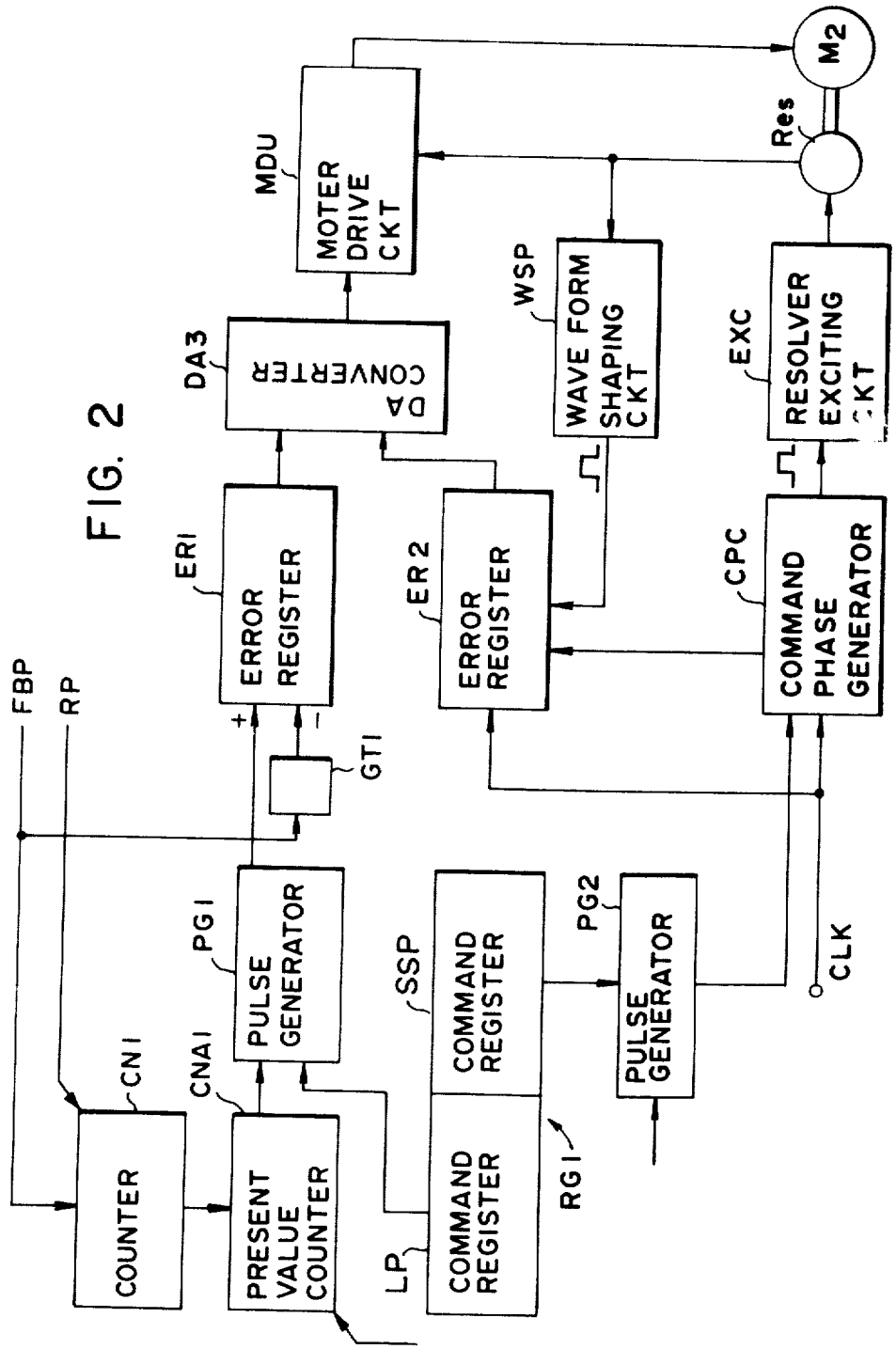
FIG. 2 is a block diagram showing the principal part of a second embodiment of this invention.

FIG. 2 shows in block form the principal part of a second embodiment of this invention, which is suitable for use when a smaller rotational positioning unit than the minimum one available from the pulse generator GC in the first embodiment described above is required. In FIG. 2, reference character CN1 indicates a counter for detecting the current position of the spindle, which counter is supplied with feedback pulses FBP and specific rotational position pulses RP from the same pulse counter as that employed in the first embodiment. Reference character CNA1 designates a present value counter, in which the content of the counter CN1 is preset prior to the start of the positioning. Reference character RG1 identifies a command register, which includes a positive number part LP and a fraction part SSP; M2 denotes a motor for positioning; Res represents a resolver coupled with the motor M2; PG1 and PG2 show pulse generators; GT1 refers to a gate; ER1 and ER2 indicate error registers; DA3 designates a D-A converter; MDU identifies a motor drive circuit; CPC denotes a command phase generator; EXC represents a resolver exciting circuit; and WSP shows a waveform shaping circuit.

In FIG. 2, the pulse generator PG1 generates command pulses corresponding in number to the difference between the content of the positive number part LP of the register RG1 (i.e., the positive number part of the positioning command value) and the content of the counter CNA1, and the command pulses are applied to the error register ER1. The feedback pulses FBP are negatively fed back to the error register ER1 via the gate GT1, and the content of the error register ER1 is applied via the D-A converter DA3 and the motor drive circuit MDU to the motor M2 to drive it. When the number of feedback pulses FBP equals the number of command pulses, the positioning operation concerning the positive part is completed. On the other hand, the content of the fraction part of the register RG1 (that is, the fraction part of the positioning command value) is converted by the pulse generator PG2 to fraction part command pulses of the corresponding number, which are provided to the command phase generator CPC.

The command phase generator CPC is constructed as a counter which always counts reference pulses CLK of a constant frequency and which produces a rectangular output signal having a period corresponding to n reference pulses CLK. When the command pulses from the pulse generator PG2 are fed to the command phase generator CPC, its output signal is advanced in phase corresponding to the value of the fraction part SSP. The waveform shaping circuit WSP generates a feedback phase signal of the same period as the abovesaid command phase signal. The error register ER2 counts the reference pulses CLK in the time interval between the rise of the command phase signal and that of the feedback phase signal (that is, the phase difference between these two signals) and applies the count value as a digital quantity to the D-A converter DA3; for each period, the error register ER2 repeats this operation to drive the second motor M2 via the motor drive circuit MDU. With the rotation of the motor M2, the rotor of the resolver Res is rotated to advance the phase of the feedback phase signal. As a consequence, the motor M2 is driven until the difference between the command phase and the feedback phase becomes zero; thus the motor M2 is rotated through an angle corresponding to the numerical value set in the fraction part SSP of the register RG1.

In this second embodiment, if the capacity of the fraction part is selected to be n and if the counter capacity of the command phase generator CPC is selected so that the capacity of one period of the command phase signal becomes n, it is possible to accomplish positioning of the spindle in terms of 1/n rather than the unit of the feedback pulses FBP from the pulse generator. In the second embodiment, the command phase generator is adjusted so that it is reset at the beginning of the positioning operation and so that the phase of its output signal is a reference phase (corresponding to the lattice point where the fraction part is zero).

As has been described in the foregoing, according to this invention, a pulse generator is coupled with a spindle and means is provided for counting feedback pulses from the pulse generator, so that the current rotational position of the spindle can be detected and, when positioning the spindle at a desired rotational angular position, there is no need of stopping the spindle once at a specified position; therefore, the spindle can be rapidly positioned at a commanded position.

It will be apparent that many modifications and variations may be effected without departing from the scope of novel concepts of this invention.

What is claimed is:

1. A spindle control system for a spindle control arrangement including a first motor for driving a spindle and a second motor for positioning the spindle, comprising:

first clutch means for selectively coupling the first motor with the spindle;

second clutch means for selectively coupling the second motor with the spindle;

a pulse generator coupled with the spindle for generating pulses proportional in number to the rotational angle of the spindle;

counter means for counting the pulses from the pulse generator to detect the rotational position of the spindle; and means responsive to the counter means for controlling the rotational positioning of the spindle by the second motor via the second clutch means with the first clutch means disconnected.

2. A spindle control system according to claim 1, further comprising register means for storing a command position corresponding to a predetermined angular position of the spindle, said means for controlling the positioning of the spindle additionally being responsive to the register means and comprising means for reducing the difference between the current position of the spindle and the commanded position to zero.

3. A spindle control system according to claim 1, which further includes register means for storing a command position corresponding to a predetermined angular position of the spindle, said command position including a positive number part and a fraction part, means for generating a signal of a phase corresponding to the content of the fraction part set in the register means, and a resolver coupled with the second motor, said means for controlling the positioning of the spindle additionally being responsive to the register means, to the means for generating a signal of a phase corresponding to the content of the fractional part set in the register means, and to the resolver and comprising means for reducing the difference between the current position of the spindle and the positive number part set in the register means to zero and reducing the phase difference between the signal of a phase corresponding to the content of the fraction part set in the register means and the phase obtained by the resolver to zero.

4. A spindle control system for a machine tool having a first motor for driving a spindle during turning operations and a second motor for rotating said spindle to a predetermined angular position during positioning operations, comprising:

first clutch means for selectively coupling the first motor with the spindle during turning operations;

second clutch means for selectively coupling the second motor with the spindle during positioning operations;

first means coupled with said spindle during both turning and positioning operations for generating feedback pulses at predetermined fractions of a revolution of said spindle and reset pulses once per revolution of said spindle;

second means connected to said first means for counting said feedback pulses, said second means being reset by said reset pulses;

third means connected to said second means for receiving the content of said second means after said spindle has been stopped at an arbitrary angular position;

fourth means for storing a predetermined angular position value corresponding to an integral number of said predetermined fractions of a revolution of said spindle; and fifth means connected to said third and fourth means for energizing said second motor to rotate said spindle via said second clutch means to said predetermined angular position.

5. The system of claim 4, wherein said fifth means comprises sixth means connected to said third and fourth means for generating a first difference signal corresponding to the difference between the values stored in said third and fourth means, seventh means responsive to said first difference signal and to said feedback pulses for generating a second difference signal corresponding to the difference between said first difference signal and the total number of feedback pulses generated since said spindle was stopped at said arbitrary angular position, eighth means for converting said second difference signal to an analog signal, and ninth means responsive to said analog signal for energizing said second motor to rotate until said analog signal becomes substantially zero.

6. The system of claim 5, wherein said ninth means comprises a tacho generator connected to said second motor, tenth means for generating a signal corresponding to the difference between said analog signal and the output of said tacho generator, and an amplifier connecting said tenth means and said second motor.

7. The system of claims 4, 5, or 6, further comprising eleventh means for storing a predetermined angular position value corresponding to a fractional part of one of said predetermined fractions of a revolution of said spindle, a resolver coupled with said second motor, and twelfth means connected to eleventh means and to said resolver for energizing said second motor to rotate said spindle until the output of said resolver corresponds to the value stored in said eleventh means.

* * * * *